United States Patent
Lee et al.

(10) Patent No.: US 7,535,886 B2
(45) Date of Patent: May 19, 2009

(54) MOBILE COMMUNICATION SYSTEM EMPLOYING HIGH SPEED DOWNLINK PACKET ACCESS AND METHOD FOR IMPROVING DATA PROCESSING SPEED IN THE SAME

(75) Inventors: Kang-Gyu Lee, Yongin-si (KR); Sung-Wook Park, Yongin-si (KR); Sang-Hoon Chae, Suwon-si (KR); Jin-Young Oh, Yongin-si (KR); Sang-Jun Na, Seoul (KR)

(73) Assignee: Samsung Electronics Co., Ltd (KR)

( * ) Notice: Subject to any disclaimer, the term of this patent is extended or adjusted under 35 U.S.C. 154(b) by 847 days.

(21) Appl. No.: 11/035,189

(22) Filed: Jan. 13, 2005

(65) Prior Publication Data
US 2005/0174985 A1    Aug. 11, 2005

(30) Foreign Application Priority Data
Feb. 6, 2004    (KR) ...................... 10-2004-0007873

(51) Int. Cl.
*H04B 7/212*    (2006.01)
(52) U.S. Cl. .................... 370/348; 370/470; 370/472
(58) Field of Classification Search ................. 370/335, 370/412, 469, 496, 349, 470, 472; 709/229
See application file for complete search history.

(56) References Cited

U.S. PATENT DOCUMENTS

| | | | | |
|---|---|---|---|---|
| 5,491,802 | A * | 2/1996 | Thompson et al. | 709/236 |
| 2003/0039270 | A1* | 2/2003 | Chang et al. | 370/469 |
| 2003/0198225 | A1 | 10/2003 | Mononen | |
| 2003/0214906 | A1* | 11/2003 | Hu et al. | 370/231 |
| 2004/0141515 | A1* | 7/2004 | Xiao | 370/412 |

FOREIGN PATENT DOCUMENTS

| WO | WO 01/52565 | 7/2001 |
|---|---|---|
| WO | WO 01/97446 | 12/2001 |

OTHER PUBLICATIONS

ARIB STD-T63-25.321 V5.1.0 MAC protocol specification (Rlease 5).*

* cited by examiner

*Primary Examiner*—Ricky Ngo
*Assistant Examiner*—David Oveissi
(74) *Attorney, Agent, or Firm*—The Farrell Law Firm P.C.

(57) ABSTRACT

A method for improving the data processing speed in a mobile communication system employing a High Speed Downlink Packet Access (HSDPA) is provided. A data unit for the HSDPA services is produced by inserting a header padding field into a header of the data unit, and transmitting the produced data unit.

15 Claims, 8 Drawing Sheets

MOBILE COMMUNICATION SYSTEM EMPLOYING HIGH SPEED DOWNLINK PACKET ACCESS AND METHOD FOR IMPROVING DATA PROCESSING SPEED IN THE SAME

PRIORITY

This application claims priority to an application entitled "MOBILE COMMUNICATION SYSTEM EMPLOYING HIGH SPEED DOWNLINK PACKET ACCESS AND METHOD FOR IMPROVING DATA PROCESSING SPEED IN THE SAME", filed in the Korean Intellectual Property Office on Feb. 6, 2004 and assigned Ser. No. 2004-0007873, the contents of which are incorporated herein by reference.

BACKGROUND OF THE INVENTION

1. Field of the Invention

The present invention relates to a mobile communication system, and more particularly to a mobile communication system employing a High Speed Downlink Packet Access (HSDPA) and a method for improving the data processing speed in the same.

2. Description of the Related Art

High Speed Downlink Packet Access (HSDPA) is a generic term used to describe the control channels associated with High Speed-Downlink Shared Channels (HS-DSCHs) for supporting high speed downlink packet transmission in wideband code divisional multiple access (W-CDMA) communication systems, and devices, systems and methods using the channels. A Hybrid Automatic Retransmission reQuest (HARQ) method has been proposed to support the HSDPA. The HARQ method and the structure of a conventional W-CDMA communication system will now be described with reference to FIG. 1.

FIG. 1 is a block diagram showing the structure of the conventional W-CDMA communication system.

The W-CDMA communication system includes a Core Network (CN) 100, a plurality of Radio Network Subsystems (RNS) 110 and 120 and User Equipment (UE) 130. Each of the RNSs 110 and 120 includes a Radio Network Controller (RNC) and a plurality of Node Bs (also referred to as base stations or cells). For example, the RNS 110 includes an RNC 111 and a plurality of Node Bs 113 and 115. RNCs are classified into a Serving RNC (SRNC), a Drift RNC (DRNC) or a Controlling RNC (CRNC) according to their roles. Specifically, the SNRC and the DRNC are classified according to the services they provide to the UE. That is, an RNC, which manages information of a UE and handles data communication between the UE and the core network, is referred to as an SRNC of the UE. When data of a UE is transmitted to and received from the SRNC of the UE via a different RNC, the different RNC is referred to as a DRNC of the UE. An RNC for controlling Node Bs is referred to as a CRNC of the Node Bs. In the example of FIG. 1, if the RNC 111 manages information of the UE 130, the RNC 111 is an SRNC of the UE 130, and if the UE 130 moves and communicates its data via the RNC 112, the RNC 112 is a DRNC of the UE 130. The RNC 111, which controls the Node B 113, is a CRNC of the Node B 113.

A description will now be given of the HARQ method, particularly the n-channel Stop And Wait Hybrid Automatic Retransmission reQuest (SAW HARQ) method. A general ARQ method is based on exchange of acknowledgement (ACK) and retransmission packet data between a UE and an RNC. To increase the transmission efficiency of the ARQ method, the HARQ method employs the Forward Error Correction (FEC) technique. In the HSDPA, an ACK and retransmission packet data are exchanged between the UE and the Node B. The HSDPA introduces the n-channel SAW HARQ method in which N processes are provided so that even when a specific process at a transmitting side has not received an ACK to its transmission, the packet data can be transmitted through other processes set in the transmitting side. The Stop And Wait Automatic Retransmission reQuest (SAW ARQ) method transmits the next packet data only after receiving an ACK to previously transmitted packet data. As a result, the SAW ARQ method has low channel utilization. The n-channel SAW HARQ method can increase the channel utilization by allowing the other processes to consecutively transmit other packet data without receiving an ACK to the previous packet data. Specifically, in the n-channel SAW HARQ method, N processes are set between the UE and the Node B, and the transmitting side also transmits process identifiers allowing the receiving side to identify each process. Thus, the UE, which has received a plurality of packet data, can identify a process through which each of the plurality of packet data was transmitted so that the UE can afterwards perform operations corresponding to the identified process.

The layer architecture of the W-CDMA system employing the HSDPA described above requires an additional function for the HARQ in the Medium Access Control (MAC) layer. In order to satisfy this requirement, the layer architecture of the W-CDMA system employing the HSDPA has been modified from the conventional layer architecture of the W-CDMA system that does not employ the HSDPA. Specifically, the layer architecture of the W-CDMA system employing the HSDPA has implemented a Medium Access Control-high speed (MAC-hs) entity to support the HSDPA, in addition to the Medium Access Control—(MAC-c/sh) ("control/shared") and Medium Access Control—(MAC-d) ("dedicated") entities in the MAC layer architecture of the conventional W-CDMA communication system.

The MAC-hs entity primarily provides functions for the HARQ on the High Speed-Downlink Stored Channel (HS-DSCH) to support the HSDPA. If no error is detected in a data block (i.e. packet data) received from a wireless channel, the MAC-hs entity transmits the ACK to the Node B. If an error is detected in the data block, the MAC-hs entity produces a Non ACKnowledgement (NACK) requesting retransmission of the data block and transmits the produced NACK to the Node B.

The MAC layer provides a service referred to as the "unacknowledged transfer of MAC SDU" to the upper layer. In this service, the MAC layer receives MAC Protocol Data Unit(s) (PDU(s)) from a physical layer (PHY) as its lower layer, and processes the received MAC PDU(s) to produce a MAC Service Data Unit(s) (SDU(s)), and then transfers the MAC SDU(s) (i.e. Radio Link Control (RLC) PDU(s)) in a suitable manner to the RLC layer as its upper layer. This description of the service takes into account only the downlink of the UE since the HSDPA service is associated with downlink in the present invention.

Channels used in the HSDPA communication system can be divided into downlink (DL) and uplink (UL) channels. Some examples of the downlink channel are a High Speed-Shared Control channel (HS-SCCH), an associated Dedicated Physical Channel (DPCH) and a High Speed-Physical Downlink Shared Channel (HS-PDSCH), and an example of the uplink channel is a High Speed Dedicated Physical Control Channel (HS-DPCCH).

The HS-PDSCH is a physical channel supporting user traffic for HSDPA services, and the HS-DSCH is a transport channel (i.e. a channel for transferring MAC-PDU(s) between the PHY and the MAC layers) mapped to the physical channel. Actual user data carried through the HS-DSCH is referred to as a Medium Access Control-high speed Protocol Data Unit (MAC-hs PDU). The structure of the MAC-hs PDU will now be described with reference to FIG. 2.

FIG. 2 is a drawing showing the structure of a MAC-hs PDU carried through the HS-DSCH.

As shown in FIG. 2, the MAC-hs PDU includes a MAC-hs header field 210, a MAC-hs Service Data Unit (SDU) field 220 and a padding field 230. The MAC-hs header 210 includes various fields as follows.

(1) Version Flag (VF): a one-bit flag indicating the version of a communication system.

(2) Queue ID: a 3-bit field providing for the identification of a priority queue of the MAC-hs PDU 200. That is, the Queue ID is an identification of a reordering queue managed by the UE to support the HSDPA.

(3) Transmission Sequence Number (TSN): a 6-bit sequence number indicating the sequence of the transmission of the MAC-hs PDUs in the priority queue.

(4) SID_x: a 3-bit field indicating the size of the MAC-dedicated (MAC-d) PDUs belonging to the x-th set of concatenated MAC-d PDUs of the same size included in a MAC-hs PDU.

(5) N_x: a 7-bit field indicating the number of the MAC-d PDUs belonging to the x-th set of concatenated MAC-d PDUs of the same size.

(6) F (Flag): a one-bit flag indicating if the F field is the end of the current MAC-hs header. If the flag value is set to "1", it indicates that the F field is the end of the current MAC-hs header, followed by a MAC-hs SDU, and if the flag value is set to "0", it indicates that the F field is followed by an SID field.

As shown in FIG. 2, one MAC-hs PDU 200 may include a plurality of MAC-hs SDUs 220. That is, the MAC-hs payload includes a plurality of MC-hs SDUs. The padding field 230 is added to the MAC-hs PDU 200 when the sum of the sizes of the MAC-hs payload and header is less than a transport block set size (i.e. the size of a transport block set transferred to an associated HS-SCCH).

In FIG. 2, the MAC-hs SDU 220 is transferred to the MAC-d entity so that the MAC-d header is removed, and is then transferred as the MAC-d SDU(s) (i.e. RLC PDU(s)) to the upper RLC layer. The MAC-hs SDU is the same as the MAC-d PDU. As shown in FIG. 2, each MAC-hs PDU includes a MAC-hs header of at least 21 bits as expressed by Equation 1.

$$\text{Length of MAC-hs header}=10+11P\ (P=1, 2, 3 \ldots) \quad (1)$$

where P is the number of sets of SID, N and F fields.

The MAC-d PDU, which is the MAC-hs SDU, is configured as shown in FIG. 3.

FIG. 3 is a diagram showing the configuration of each MAC-d PDU mapped to an HS-DSCH.

As shown in FIG. 3, each MAC-d PDU 220 includes a C/T field 221 and a MAC SDU 222. The C/T field 221 is used as identification of a logical channel transmitted through the HS-DSCH. The logical channel is used to allow the MAC layer to provide a data transfer service to the RLC layer as its upper layer. Each C/T field 221 is composed of 4 bits and can identify up to 15 logical channels. One logical channel is generally allocated to one radio bearer, but a plurality of logical channels may also be used to set one radio bearer as circumstances permit. Thus, the C/T field 221 can be used as an identification for each logical channel, and the MAC SDU 220 is transferred to the upper layer through the identification process.

In FIG. 3, the 4-bit C/T field in each MAC-d PDU may be present or not depending on whether or not multiplexing on the MAC is performed. Since the HSDPA does not operate in TM (Transparent Mode) RLC mode due to the ciphering, the size of the MAC SDU (i.e. an RLC PDU) in FIG. 3 is a multiple of 8 bits. The size of each MAC-d PDU (MAC-hs SDU) can be expressed by Equation 2.

$$\text{Length of MAC-d PDU}=8M+4K \quad (2)$$

(M=1, 2, . . . . integer; and K is 0 or 1)

In the HSDPA, the MAC layer processes a MAC-hs PDU received from the physical layer to produce RLC PDU(s) (i.e. MAC-d SDU(s)) and transfers the produced MAC-d SDU(s) to the upper RLC layer.

In most cases, the length of the MAC-hs header of the MAC-hs PDU received through the HS-PDSCH is not a multiple of 8 bits. The MAC-hs PDU is composed of a bit stream of a consecutive MAC-hs header and payload.

Due to the structure of the MAC-hs PDU, bit operations such as bit masking, bit stream coping and bit shifting, which lower the processing speed of the HSDPA service, must be implemented when the MAC layer in the UE system processes and converts the MAC-hs PDU to MAC-d PDU(s) and also when the RLC layer processes the RLC PDU(s) extracted from the MAC-hs PDU to produce the RLC SDU(s).

Even when the MAC-d PDUs transferred through a MAC-hs PDU are a multiple of 8 bits (i.e. even when no multiplexing on MAC is performed), if the MAC-hs header is not a multiple of 8 bits, the MAC-hs header and the MAC-d PDU(s) are composed of a data stream of consecutive bits, so that bit operations, which may decrease the data transfer rate, are required when the MAC layer processes and transfers such a data stream to the RLC layer and also when the RLC layer forms the RLC SDU(s).

SUMMARY OF THE INVENTION

Therefore, the present invention has been made in view of at least the above problems, and it is an object of the present invention to provide a mobile communication system employing a High Speed Downlink Packet Access (HSDPA) and a method for improving the data processing speed in the same without requiring bit operations.

It is another object of the present invention to provide a mobile communication system employing a HSDPA and a method for improving the data processing speed in the same by modifying the structure of a MAC-hs PDU.

In accordance with the present invention, the above and other objects can be accomplished by the provision of a method for improving the data processing speed in a mobile communication system employing a High Speed Downlink Packet Access (HSDPA), the method comprising the steps of producing a data unit for the HSDPA services by inserting a header padding field into a header of the data unit; and transmitting the produced data unit.

In the present invention, in the case where a radio bearer, to which multiplexing of logical channels mapped to the HS-DSCH channel in the MAC layer is not applied, is set up, a header padding field is added to an end portion of the MAC-hs header of a MAC-hs PDU when the Node B forms the MAC-hs PDU for HSDPA services so that the length of the MAC-hs header becomes a multiple of 8 bits. If the length of the MAC-hs header, composed of VF, Queue ID and TSN fields and sets of SID, N and F fields, is a multiple of 8 bits, no header padding field is added to the MAC-hs header. The length of the header padding field to be added is selected from 0 to 7 bits so that the length of the MAC-hs header becomes a multiple of 8 bits.

When the UE receives a MAC-hs PDU including a MAC-hs header, the length of which is a multiple of 8 bits, the UE decodes the MAC-hs header and transfers MAC-d PDU(s), byte-aligned in the MAC-hs PDU, to an upper layer. Here, the MAC layer of the UF determines the length of the effective fields (VF, Queue ID, TSN, SIDs, Ns and Fs) of the MAC-hs header. If the effective field length of the MAC-hs header is a multiple of 8 bits, the MAC layer of the UE transfers the MAC-d PDU(s) subsequent to the last F field to the upper RLC layer. If the effective field length of the MAC-hs header is not a multiple of 8 bits, the MAC layer of the UE determines that the last F field is followed by a header padding field of one of the 1 to 7 bits corresponding to the determined effective field length. The MAC layer then recognizes and handles a portion of the MAC-hs PDU, which starts with the first bit of the MAC-hs PDU and ends with an 8 m-th (m=1, 2, 3 . . . ) bit thereof immediately after the last F field, as a MAC-hs header. Thereafter, the MAC layer of the UE recognizes and handles a data portion of the MAC-hs PDU, which starts with a bit immediately after the MAC-hs header, as the MAC-d PDU(s). Here, no bit operation is required since the MAC-hs SDU(s) (MAC-d PDU(s)) have already been byte-aligned in the memory storing the MAC-hs PDU.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Now, preferred embodiments of the present invention will be described in detail with reference to the annexed drawings. In the following description, only elements or functions required to understand the present invention will be described, and a detailed description of other elements or functions will be omitted when it may obscure the subject matter of the present invention.

First, a protocol stack of an HSDPA communication system will be described with reference to FIG. 4.

Figure 4:
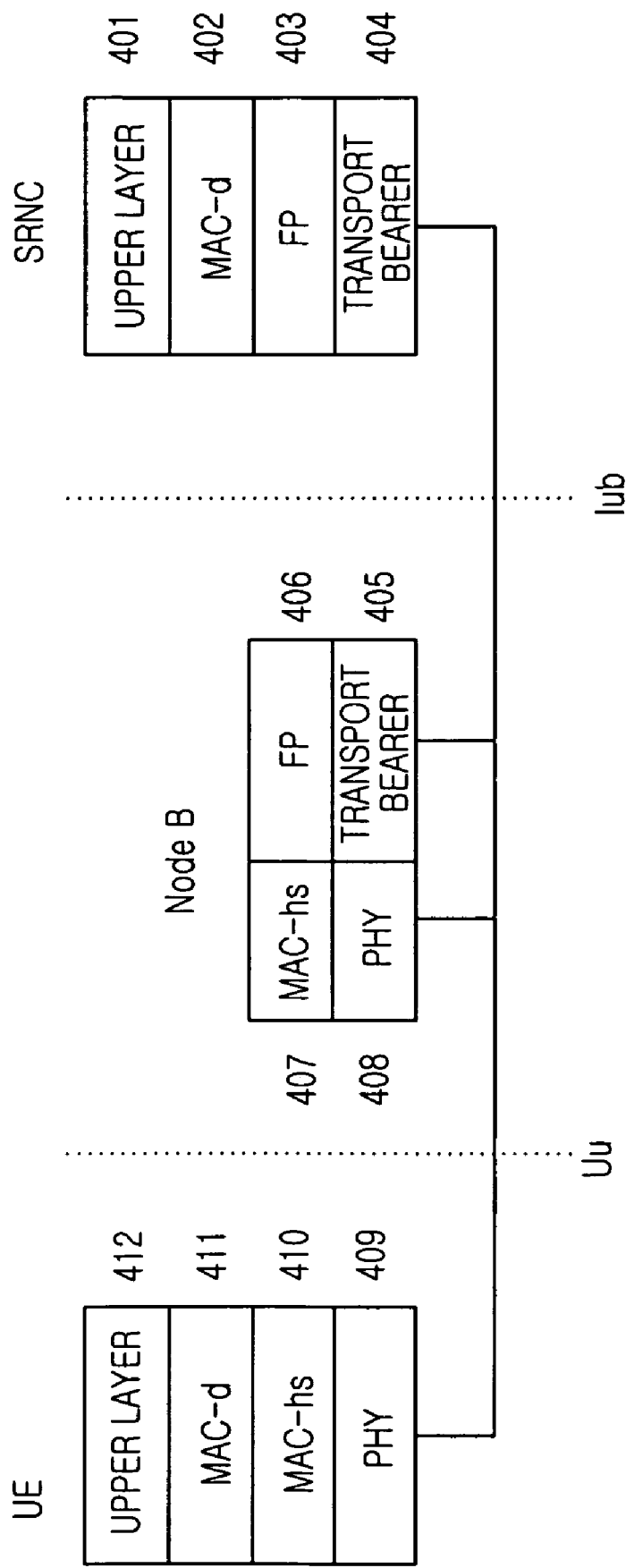
FIG. 4 is a diagram showing MAC layer architecture of a general communication system employing a HSDPA.

FIG. 4 is a diagram showing MAC layer architecture of a communication system employing the HSDPA scheme to which the present invention is applied.

The MAC layer is composed of a MAC-d layer and a MAC-hs layer. As shown in FIG. 4, the MAC layer includes a MAC-d layer 411 and a MAC-hs layer 410 at the UE; a MAC-hs layer 407 at the Node B; and a MAC-d layer 402 at the SRNC. The MAC-d layer, which is a MAC entity for controlling access to a dedicated transport channel, performs MAC functions for dedicated logical channels such as dedicated control channels (DCCH) and dedicated traffic channels (DTCH). The MAC-hs layer is additionally implemented to support HSDPA, which primarily provides functions for HARQ on the HS-DSCH to support HSDPA.

As shown in FIG. 4, when the actual user data is transferred from an upper layer 401 to the MAC-d layer 402, the MAC-d layer 402 produces a MAC-d PDU corresponding to the user data received from the upper layer 401, and transfers the produced MAC-d PDU to the Frame Protocol (FP) layer 403. The MAC-d PDU is produced by adding a MAC-d header to the user data received from the upper layer 401. The MAC-d header includes multiplexing-related information indicating to which upper layer the MAC-d PDUs are to be transferred to at the receiving side. The FP layer 403 produces the FP PDUs corresponding to the MAC-d PDUs received from the MAC-d layer 402, and transfers the produced FP PDUs to a transport bearer layer 404. The FP layer 403 associates the multiple MAC-d PDUs with one FP PDU that includes priority information of the associated MAC-d PDUs. The transport bearer layer 404 allocates a transport bearer to the FP PDUs received from the FP layer 403 and transfers the FP PDUs to a transport bearer layer 405 in the Node B using the allocated transport bearer. The SRNC transport bearer layer 404 and the Node B transport bearer layer 405 interface with each other via the Iub interface between the SRNC and the Node B. The transport bearer layer 404 is responsible for actual data transmission between the SRNC and the Node B, and may be implemented based on a AAL2/ATM system or the like.

When receiving an FP PDU from the SRNC transport bearer layer 404, the Node B transport bearer layer 405 transfers the received FP PDU to the FP layer 406, and the FP layer 406 transfers the FP PDU received from the transport bearer 405 to the MAC-hs layer 407. With reference to the priority information included in the FP PDU received from the FP layer 406, the MAC-hs layer 407 stores the received MAC-d PDUs in a corresponding priority queue.

When forming a MAC-hs PDU for HSDPA services, the Node B MAC-hs layer 407 adds a header padding field to the end of the MAC-hs header of the MAC-hs PDU so that the length of the MAC-hs header becomes a multiple of 8 bits. If the length of the MAC-hs header, composed of the VF, Queue ID and TSN fields and sets of the SID, N and F fields, is a multiple of 8 bits, the Node B MAC-hs layer 407 does not add the header padding field to the MAC-hs header. The length of the header padding field to be added is selected from 0 to 7 bits so that the length of the MAC-hs header becomes a multiple of 8 bits.

A description will now be given of the operation and configuration of a MAC-hs entity 407 in the Node B according to an embodiment of the present invention and the structure of a MAC-hs PDU configured according to the embodiment of the present invention.

Figure 5:
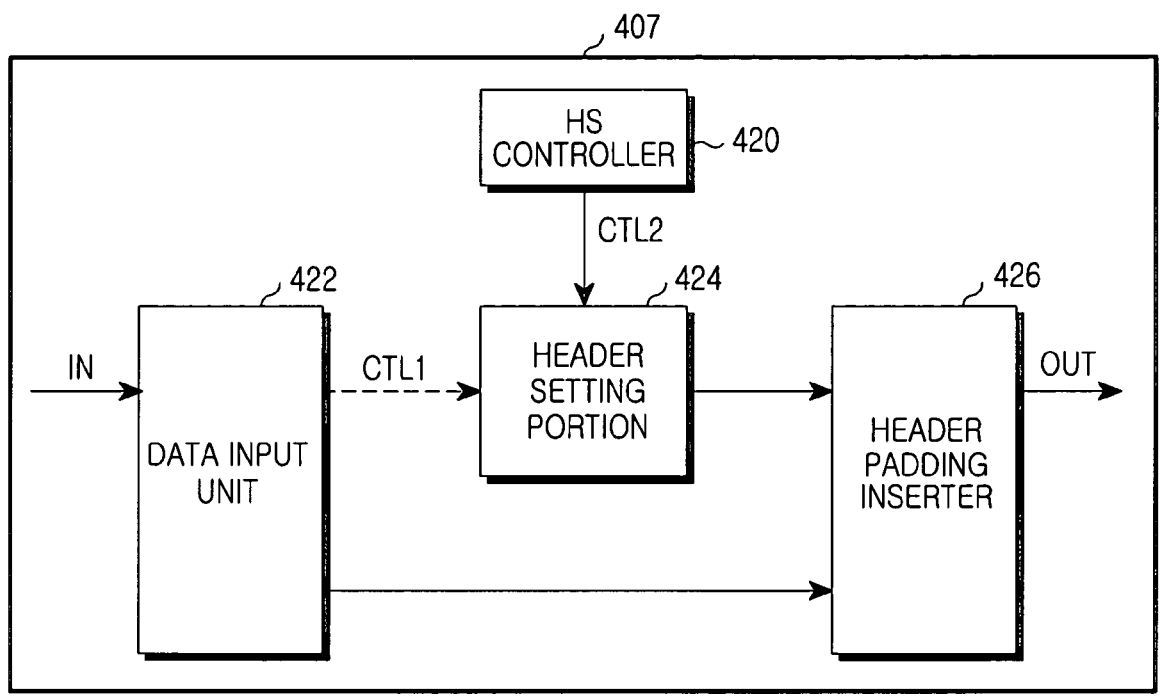
FIG. 5 is a block diagram showing the configuration of a MAC-hs entity in a Node B according to an embodiment of the present invention.

FIG. 5 is a block diagram showing the configuration of the MAC-hs entity 407 in the Node B according to the embodiment of the present invention. As shown in FIG. 5, the MAC-hs entity 407 in the Node B receives frames of MAC Service Data Units (SDUs) from the MAC-d entity 402 in the RNC 111 or 112 as described above, and produces a MAC-hs PDU according to the present invention. To accomplish this, the MAC-hs entity 407 includes an Header Set (HS) controller 420, a data input unit 422, a header setting portion 424 and a header padding inserter 426.

Figure 1:
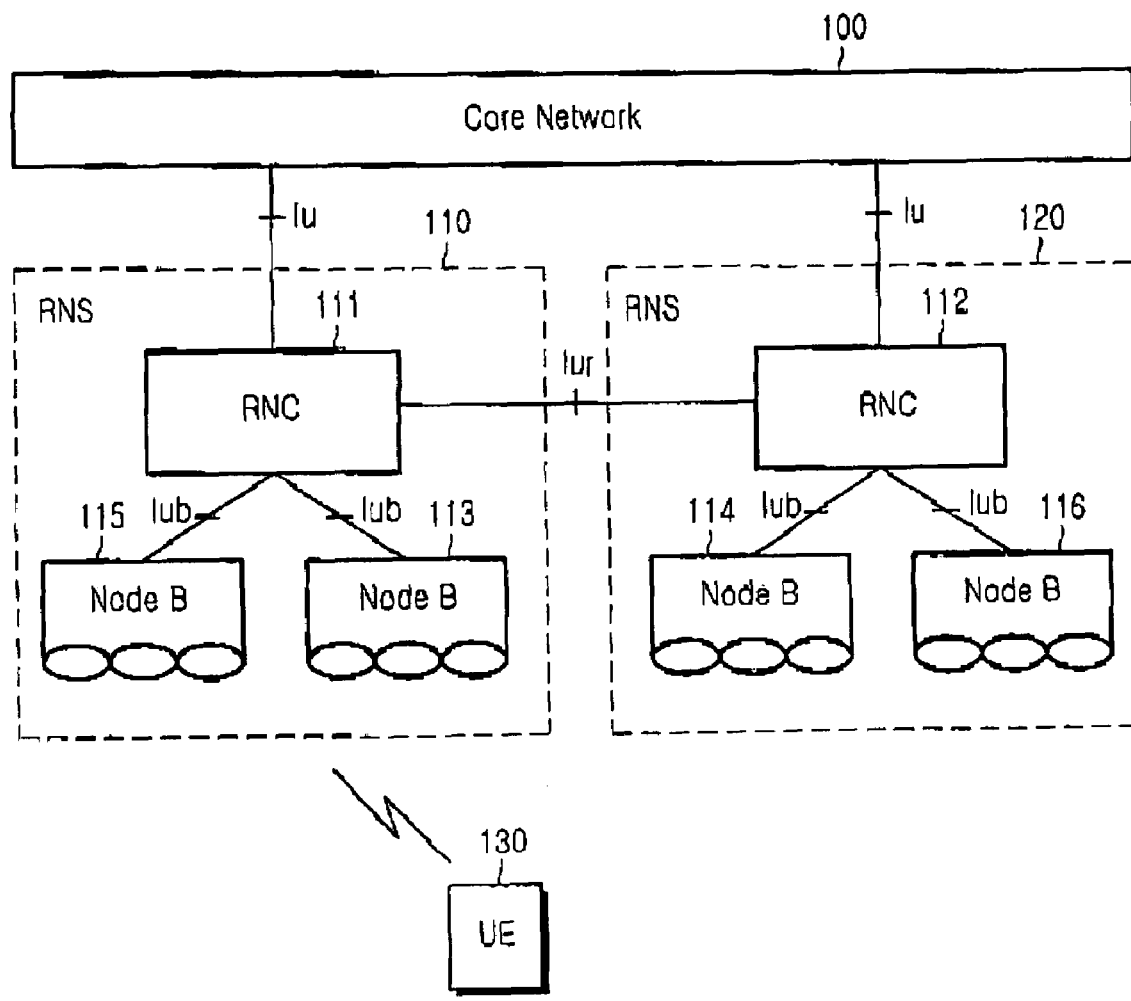
FIG. 1 is a block diagram showing the structure of a conventional mobile communication system.
Figure 2:
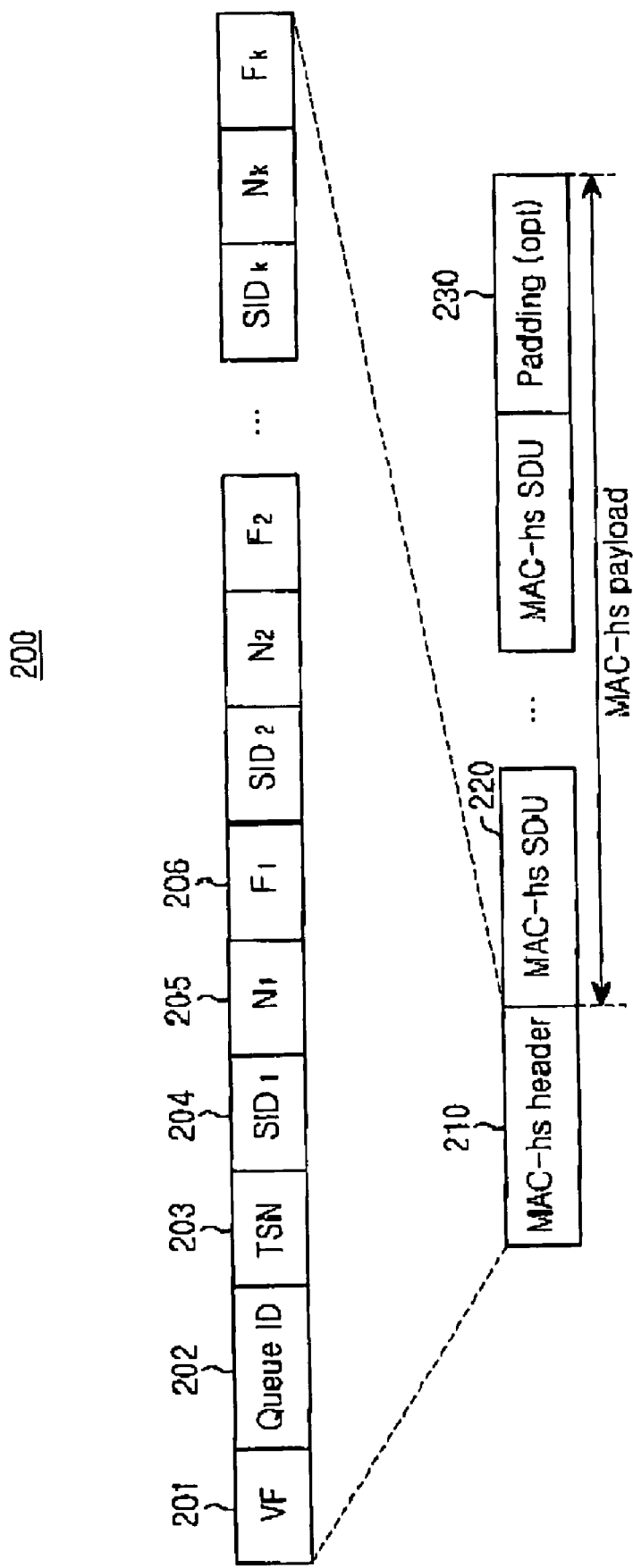
FIG. 2 is a drawing showing the structure of a data block (i.e. a MAC-hs PDU) carried through a High Speed-Physical Downlink Shared Channel (HS-DSCH)
Figure 3:
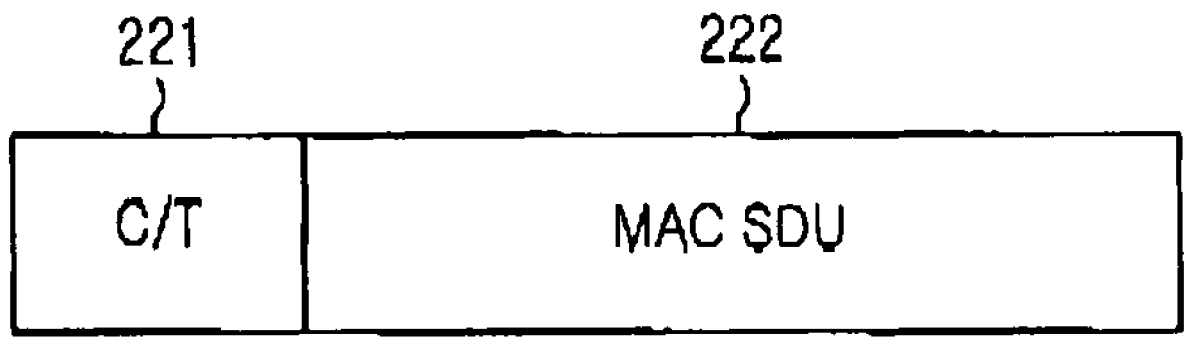
FIG. 3 is a diagram showing the structure of each MAC-hs SDU included in the MAC-hs PDU of FIG. 2.

The HS controller 420 manages MAC-hs PDU scheduling information such as the TSNs and the Queue IDs that form the MAC-hs PDUs, and provides the MAC-hs PDU scheduling information and control information (CTL2) to the header setting portion 424. The data input unit 422 receives the input data IN from the MAC-d entity 402 in the RNC 111 or 112. The input data IN received from the MAC-d entity 402 is a data stream of concatenated MAC-d PDUs, which includes a Frame Protocol (FP) header. The data input unit 422 removes the FP header from the input data IN to produce a set of MAC-hs SDUs composed of MAC-d PDUs. The data input unit 422 provides the control information such as the SID, the N and the F fields for forming the corresponding MAC-hs PDU to the header setting portion 424. The above description of FIG. 2 can be referred to for a definition of the SID, N and F fields. The data input unit 422 provides the produced MAC-hs SDU set composed of MAC-d PDUs to the header padding inserter 426. The data input unit 422 also provides control information (CTL1) regarding the MAC-d PDU block size, such as the number of sequential MAC-d PDUs of a specific block size and the block size of MAC-d PDUs included in the input data IN, to the header setting portion 424. Using the control information (CTL1 and CTL2) from the data input unit 422 and the HS controller 420, the header setting portion 424 produces a MAC-hs header, which is composed of the VF, the Queue ID and the TSN fields and sets of the SID, the N and the F fields, and provides the produced MAC-hs header to the header padding inserter 426.

Figure 6:
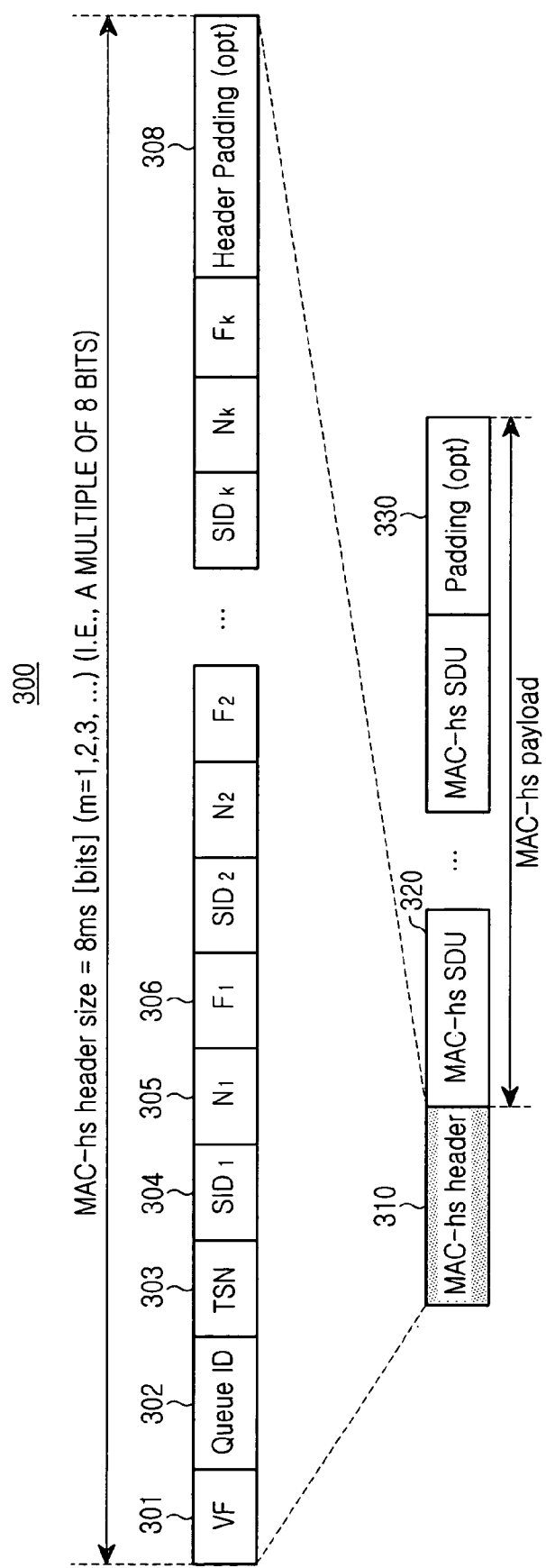
FIG. 6 is a drawing showing the structure of a MAC-hs PDU in a communication system employing a HSDPA according to an embodiment of the present invention.

When receiving a MAC-hs header 310 as shown in FIG. 6 from the header setting portion 424, the header padding inserter 426 determines if the length of effective fields of the MAC-hs header 310 is a multiple of 8 bits. If the effective field length of the MAC-hs header is a multiple of 8 bits, the header padding inserter 426 produces a MAC-hs PDU using the MAC-hs header received from the header setting portion 424 and the set of MAC-hs SDUs received from the data input unit 422.

If the effective field length of the MAC-hs header 310 is not a multiple of 8 bits, the header padding inserter 426 determines a length for the header padding field 307 that allows the length of the MAC-hs header 310 to be a multiple of 8 bits, and then adds the header padding field 307 having the determined length to the MAC-hs header 310. The header padding inserter 426 then produces a MAC-hs PDU using the set of MAC-hs SDUs received from the data input unit 422 and the MAC-hs header with the header padding field inserted therein. The header padding inserter 426 may also add padding to the set of the MAC-hs SDUs received from the data input unit 422. The structure of a MAC-hs PDU according to an embodiment of the present invention will now be described with reference to FIG. 6.

As shown in FIG. 6, the MAC-hs PDU 300 includes a MAC-hs header field 310, MAC-hs SDU fields 320 and a padding field 330. The MAC-hs SDU and padding fields 320 and 330 have the same configuration as in the prior art, and a detailed description thereof will thus be omitted.

The size of the MAC-hs header 310 in the MAC-hs PDU 300 is a multiple of 8 bits, i.e. 8 m bits (m=1, 2, 3 . . . ), as shown in FIG. 6. The MAC-hs header 310 includes a VF (Version Flag) field 301, a Queue ID field 302, a TSN field 303, SID_x fields 304, N_x fields 305, F_x (Flag) fields 306, and a header padding field 307.

When the MAC-hs layer 407 in the Node B forms a MAC-hs PDU for the HSDPA services, the header padding field 307 is added to a MAC-hs header of the MAC-hs PDU so that the length of the MAC-hs header becomes a multiple of 8 bits. If the length of the MAC-hs header, composed of the VF, the Queue ID and the TSN fields and sets of the SID, the N and the F fields, is a multiple of 8 bits, the Node B MAC-hs layer 407 does not add the header padding field 307 to the MAC-hs header. The length of the header padding field 307 to be added is selected from 0 to 7 bits so that the length of the MAC-hs header becomes a multiple of 8 bits.

When the UE receives a MAC-hs PDU including a MAC-hs header, the length of which is a multiple of 8 bits, the UE decodes the MAC-hs header and transfers MAC-d PDU(s), byte-aligned in the MAC-hs PDU, to an upper layer. Here, the MAC layer of the UE determines the length of the effective fields (VF, Queue ID, TSN, SIDs, Ns and Fs) of the MAC-hs header. If the effective field length of the MAC-hs header is a multiple of 8 bits, the MAC layer of the UE transfers the MAC-d PDU(s) subsequent to the last F field to the upper RLC layer. If the effective field length of the MAC-hs header is not a multiple of 8 bits, the MAC layer of the UE determines that the last F field is followed by a header padding field of one of the 1 to 7 bits corresponding to the determined effective field length. The MAC layer then handles a portion of the MAC-hs PDU, which starts with the first bit of the MAC-hs PDU and ends with an 8 m-th (m=1, 2, 3 . . . ) bit thereof immediately after the last F field, as a MAC-hs header. Thereafter, the MAC layer of the UE recognizes and handles a data portion of the MAC-hs PDU, which starts with a bit immediately after the MAC-hs header portion, as the MAC-d PDU(s). No bit operation is required since the MAC-hs SDU(s) (i.e. MAC-d PDU(s)) have already been byte-aligned in the memory storing the MAC-hs PDU.

Figure 7:
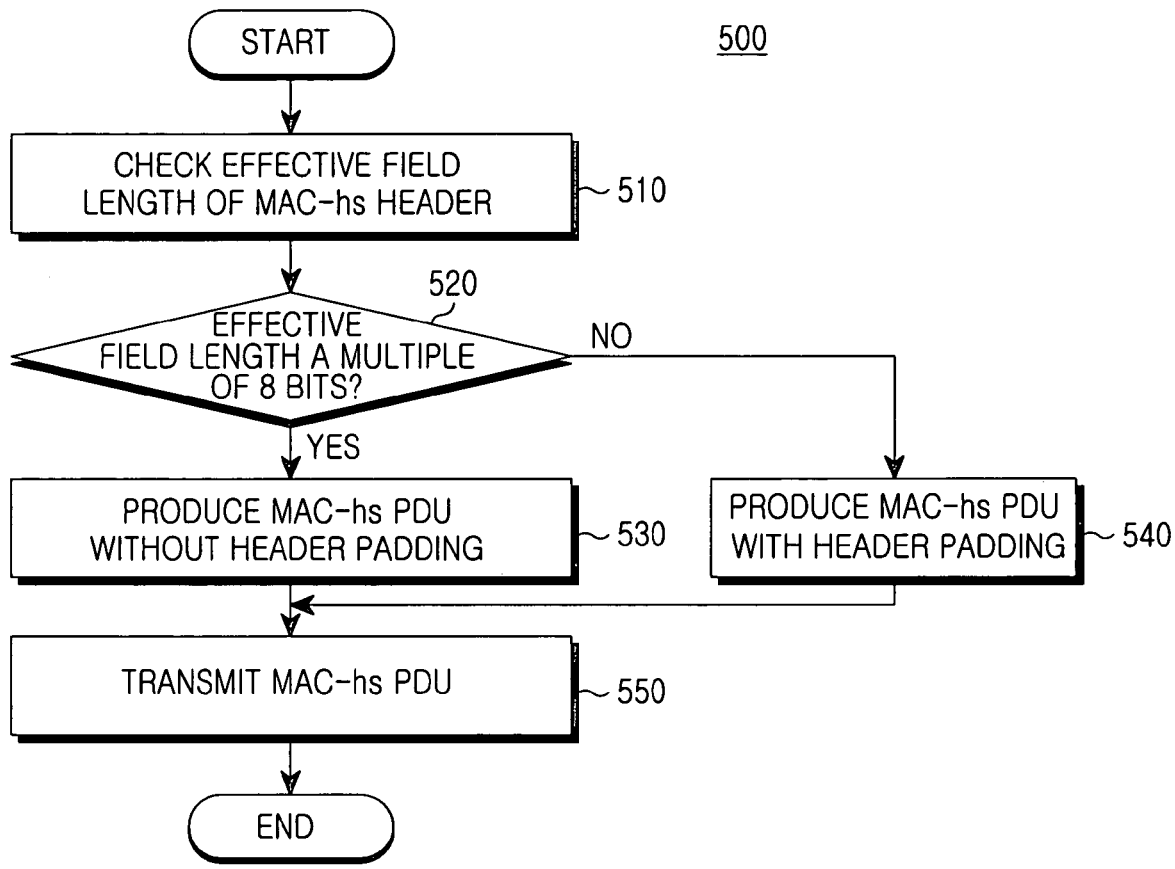
FIG. 7 is a control flow chart showing how a MAC-hs PDU is transmitted from a UTRAN in a communication system employing a HSDPA according to an embodiment of the present invention.

A description will now be given of the operation of the MAC-hs layer 407 of the Node B. FIG. 7 is a flow chart showing the operation of the MAC-hs layer 407 of the Node B in FIG. 4.

As shown in FIG. 7, the MAC-hs layer 407 of the Node B forms a MAC-hs header 310 for HSDPA services, and then determines an effective field length of the MAC-hs header 310 at step 510. The MAC-hs layer 407 of the Node B then determines, at step 520, if the effective field length of the MAC-hs header 310 is a multiple of 8 bits. If the effective field length is a multiple of 8 bits, the MAC-hs layer 407 moves to step 530 to produce a MAC-hs PDU without a header padding field 307, and then moves to step 550. If the effective field length is not a multiple of 8 bits, the MAC-hs layer 407 moves to step 540. At step 540, the MAC-hs layer 407 determines a length of a header padding field 307 that adjusts the length of the MAC-hs header 310 to be a multiple of 8 bits, and adds the header padding field 307 having the determined length to the MAC-hs header 310 to produce a MAC-hs PDU, and then moves to step 550. At step 550, the MAC-hs layer 407 of the Node B transmits the produced MAC-hs PDU to the UE.

Figure 8:
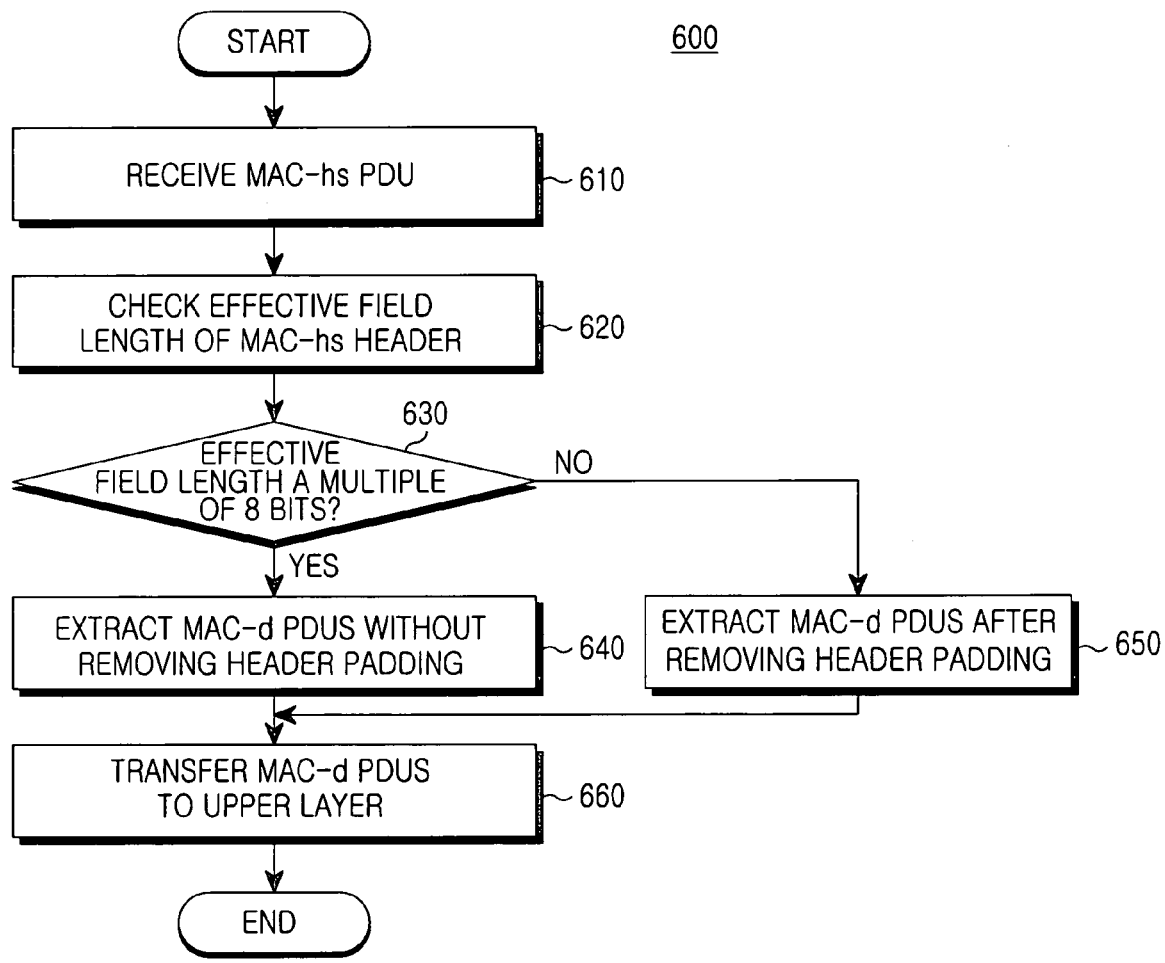
FIG. 8 is a control flow chart showing how a MAC-hs PDU is received by a UE in a communication system employing a HSDPA according to an embodiment of the present invention.

Next, a description will be given of the operation of the MAC-hs layer 410 of the UE when receiving the MAC-hs PDU from the Node B. FIG. 8 is a flow chart showing the operation of the MAC-hs layer 410 of the UE in FIG. 4.

As shown in FIG. 8, the MAC-hs layer 410 of the UE receives a MAC-hs PDU from the Node B at step 610 the layer 410 at step 620 determines the effective field length of a MAC-hs header 310 of the received MAC-hs PDU. Then, at step 630, the MAC-hs layer 410 of the UE determines if the effective field length of the MAC-hs header 310 is a multiple of 8 bits. If the effective field length of the MAC-hs header 310 is a multiple of 8 bits, the MAC-hs layer of the UE at step 640 extracts the MAC-d PDU(s) from the received MAC-hs PDU without the need to remove a header padding field 307 from the MAC-hs header 310. That is, the MAC-hs layer 410 of the UE transfers the MAC-d PDU(s) following the last F field to the upper RLC layer. Alternatively, the MAC-hs layer 410 of the UE, at step 650, extracts the MAC-d PDU(s) after removing the header padding field 307 from the MAC-hs header 310. More specifically, if the effective field length of the MAC-hs header 310 is not a multiple of 8 bits, the MAC layer 410 of the UE determines that the last F field is followed by a header padding field 307 of one of the 1 to 7 bits corresponding to the determined effective field length. The MAC layer 410 then recognizes and handles a portion of the MAC-hs PDU, which starts with the first bit of the MAC-hs PDU and ends with an 8 m-th (m=1, 2, 3 . . . ) bit thereof immediately after the last F field, as a MAC-hs header. Thereafter, the MAC layer 410 of the UE recognizes and handles a data portion of the MAC-hs PDU, which starts with a bit immediately after the MAC-hs header, as the MAC-d PDU(s). No bit operation is required since the MAC-hs SDU(s) (i.e. the MAC-d PDU(s)) have already been byte-aligned in the memory storing the MAC-hs PDU.

The MAC-hs layer 410 of the UE then transfers the MAC-d PDU produced at step 660 to the upper layer.

As apparent from the above description, the present invention provides a mobile communication system employing a High Speed Downlink Packet Access (HSDPA) and a method for improving data processing speed in the same, which have the following features and advantages. A simple header padding field is added to a MAC-hs header so that bit operations, which may be unnecessarily performed in the general use of the memory, are removed while minimizing the modification of the MAC-hs PDU format in the existing $3^{rd}$ Generation Partnership Project (3GPP) MAC specification. This allows the UE system to more effectively support a high data rate as targeted by the HSDPA services. In addition, processing for the bit operations is omitted in the developing stage of The HSDPA terminals and byte-aligned data transfer is also performed, so that the HSDPA terminals can be implemented with simpler MAC-hs PDU processing blocks.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for improving a data processing speed in a mobile communication system employing a High Speed Downlink Packet Access (HSDPA), the method comprising the steps of:
    a) producing a data unit for HSDPA services by inserting a header padding field into a header of the data unit;
    b) transmitting the produced data unit; and
    c) determining if the header padding field is to be inserted into the header of the data unit,
    wherein step c) includes the steps of:
    c-1) determining an effective field length of the header of the data unit; and
    c-2) determining if effective field length of the header of the data unit is a multiple of n bits so that the effective field length of the header can be divided on the same basis as the length of a payload of the data unit, and
    wherein when receiving the data unit, a user equipment (UE) determines if the effective field length of the header of the received data unit is a multiple of n bits, and if the effective field length of the received data unit is not a multiple of n bits, the UE extracts the payload of the received data unit, after removing the header padding field from the header of the received data unit, and transfers the extracted payload to an upper layer.

2. The method according to claim 1, wherein the header padding field is inserted into an end portion of the header of the data unit.

3. The method according to claim 1, wherein step a) includes the step of inserting the header padding field into the header of the data unit, the header padding field being of a length to adjust the total length of the header to be a multiple of 8 bits so that the total length of the header can be divided on the same basis as the length of the payload of the data unit.

4. The method according to claim 1, wherein if the effective field length of the received data unit is a multiple of n bits, the UE extracts the payload of the received data unit subsequent to the header thereof, and transfers the extracted payload to an upper layer.

5. The method according to claim 1, wherein the n bits are 8 bits.

6. The method according to claim 3, wherein the n bits are 8 bits.

7. The method according to claim 4, wherein the n bits are 8 bits.

8. A method for improving a data processing speed in a mobile communication system transmitting a data unit formed to include a header and a payload, the method comprising the steps of:
    a) when a data unit is produced, determining if a header padding field is to be inserted into a header of the data unit, based on an effective field length of the header of the data unit;
    b) transmitting the produced data unit;
    c) when a device receives the data unit, determining by the device if a header padding field is to be removed from the header of the received data unit, depending on the effective field length of the header of the received data unit; and
    d) if the effective field length of the header is a multiple of n bits, extracting a payload included in the received data unit by the device without removing the header padding field.

9. The method according to claim 8, wherein the n bits are a memory read/write operation unit.

10. A mobile communication system employing an HSDPA, comprising:
    a Node B for producing a data unit for HSDPA services by inserting a header padding field into a header of the data unit, and transmitting the produced data unit; and
    a user equipment (UE) for receiving the data unit, and determining if an effective field length of the header of the received data unit is a multiple of n bits,
    wherein if the effective field length of the received data unit is not a multiple of n bits, the UE extracts the payload of the received data unit, after removing the header padding field from the header of the received data unit, and transfers the extracted payload to an upper layer, and
    wherein if the effective field length of the received data unit is a multiple of n bits, the UE extracts the payload of the received data unit without removing the header padding field from the header of the received data unit, and transfers the extracted payload to the upper layer.

11. The system according to claim 10, wherein the Node B includes:
a header setting portion for receiving control information for the header of the data unit, and producing and outputting the header of the data unit including the control information; and
a header padding inserter for determining if a header padding field is to be inserted into the header of the data unit received from the header setting portion, and inserting the header padding field into the header of the data unit.

12. The system according to claim 11, wherein the header padding inserter determines the effective field length of the header of the data unit, and determines if the effective field length of the header of the data unit is a multiple of n bits so that the effective field length of the header can be divided on the same basis as the length of a payload of the data unit.

13. The system according to claim 11, wherein the header setting portion and the header padding inserter are implemented in a MAC layer of the Node B.

14. The system according to claim 12, wherein the n bits are 8 bits.

15. The system according to claim 10, wherein the n bits are 8 bits.

* * * * *